(12) United States Patent
Lutz et al.

(10) Patent No.: US 7,300,694 B2
(45) Date of Patent: Nov. 27, 2007

(54) MULTILAYER BODY WITH A FIRST LASER-SENSITIVE LAYER AND A SECOND LASER-SENSITIVE LAYER AND METHOD FOR GENERATION OF A MULTILAYER IMAGE IN SAID MULTILAYER BODY

(75) Inventors: Norbert Lutz, Rückersdorf (DE);
Gerhard Zinner, Pyrbaum (DE);
Matthias Schumacher, Borchen (DE);
Ulrich Knaack, Paderborn (DE); Dirk Fischer, Paderborn (DE)

(73) Assignees: Leonard Kurz GmbH & Co. KG, Furth (DE); ORGA Systems GmbH, Paderborn (DE)

( * ) Notice: Subject to any disclaimer, the term of this patent is extended or adjusted under 35 U.S.C. 154(b) by 363 days.

(21) Appl. No.: 10/494,098

(22) PCT Filed: May 8, 2002

(86) PCT No.: PCT/DE02/01675

§ 371 (c)(1),
(2), (4) Date: Aug. 5, 2004

(87) PCT Pub. No.: WO03/039888

PCT Pub. Date: May 15, 2003

(65) Prior Publication Data

US 2004/0265552 A1    Dec. 30, 2004

(51) Int. Cl.
*B32B 5/60* (2006.01)
*B32B 37/00* (2006.01)
*B41M 5/00* (2006.01)

(52) U.S. Cl. .................. 428/195.1; 428/323; 428/326; 428/327; 428/328; 156/272.8; 430/270.1; 430/200; 430/945; 430/944; 430/962

(58) Field of Classification Search ............. 428/195.1, 428/323, 326, 327, 328; 235/487, 494; 156/272.8; 430/270.1, 200, 945, 944, 962
See application file for complete search history.

(56) References Cited

U.S. PATENT DOCUMENTS 4,523,777 A    6/1985    Holbein et al.

(Continued)

FOREIGN PATENT DOCUMENTS

DE    30 48 733 A1    7/1982

(Continued)

*Primary Examiner*—Bruce H. Hess
*Assistant Examiner*—Lawrence Ferguson
(74) *Attorney, Agent, or Firm*—Hoffmann & Baron, LLP (57) ABSTRACT

Described is a multi-layer body having two laser-sensitive layers 4, 32. The multi-layer body is a body laminated from the overlay films 30, 32, the inlets 90, 90 and the further overlay films 30, 30. At its underside the upper overlay film 30 has a layer structure applied there, by the application of a hot stamping film. The layer structure comprises a lacquer layer 50, a reflection layer 5r, a laser-sensitive layer 4, a background layer 5 and an adhesive layer 6. A diffraction and/or hologram structure 5b is provided in the lacquer layer 5c, the reflection layer 5r and the laser-sensitive layer 4. The second laser-sensitive layer is formed by the carbon-doped overlay film 32.

By means of laser treatment, it is possible to produce a laser-induced, preferably colored image component in the upper laser-sensitive layer 4 and a further laser-sensitive image component, preferably in the form of a gray scale image, in the subjacent carbon-doped laser-sensitive layer 32. A laser-induced multi-layer image is formed in that way.

22 Claims, 7 Drawing Sheets

U.S. PATENT DOCUMENTS

| | | |
|---|---|---|
| 4,769,310 A | 9/1988 | Gugger et al. |
| 4,956,702 A | 9/1990 | McQuade et al. |
| 5,234,890 A * | 8/1993 | Burberry et al. ............ 503/227 |
| 5,240,900 A * | 8/1993 | Burberry ................... 503/227 |
| 5,773,170 A | 6/1998 | Patel et al. |
| 5,876,823 A | 3/1999 | Nagashima |
| 6,190,750 B1 | 2/2001 | Wierenga et al. |

FOREIGN PATENT DOCUMENTS

| | | | |
|---|---|---|---|
| DE | 37 38 330 | A1 | 5/1988 |
| DE | 38 40 729 | A1 | 6/1990 |
| DE | 41 34 271 | C1 | 12/1992 |
| DE | 41 31 964 | A1 | 4/1993 |
| DE | 44 10 431 | A1 | 9/1995 |
| DE | 199 55 383 | A1 | 5/2001 |
| EP | 0 219 011 | B1 | 4/1987 |
| EP | 0 230 497 | B1 | 8/1987 |
| EP | 0 327 508 | A2 | 8/1989 |
| EP | 0 420 261 | B1 | 4/1991 |
| EP | 0 738 609 | B1 | 10/1996 |
| EP | 1 190 997 | A1 | 3/2002 |
| GB | 2 240 948 | A | 8/1991 |
| JP | 03-270980 | | 12/1991 |
| JP | 11-180079 | | 7/1999 |
| WO | WO 94/12352 | | 6/1994 |
| WO | WO 96/35585 | | 11/1996 |
| WO | WO 98/19868 | | 5/1998 |

* cited by examiner

MULTILAYER BODY WITH A FIRST LASER-SENSITIVE LAYER AND A SECOND LASER-SENSITIVE LAYER AND METHOD FOR GENERATION OF A MULTILAYER IMAGE IN SAID MULTILAYER BODY

This application claims priority based on an International Application filed under the Patent Cooperation Treaty, PCT/DE02/01675, filed on May 8, 2002, and International Registration No. PCT/DE01/04154, filed on Nov. 2, 2001, both of which are incorporated herein by reference in their entirety.

BACKGROUND OF THE INVENTION

The invention concerns a multi-layer body in the form of a multi-layer film, preferably a transfer film or a laminating film or in the form of a layer composite laminated from at least one overlay film and preferably an inlet, with a laser-sensitive layer. The invention further concerns a process for producing a multi-layer image in such a multi-layer body.

Bodies which comprise laser-sensitive material are known. For example WO 96/35585 discloses various configurations of plastic bodies, more specifically in the form of a solid body or coating, which each contain a mixture of various pigments. Color marking is effected by laser treatment on the plastic body or in the coating.

WO 98/19868 describes a process which operates with specific yellow, magenta and cyan pigments which can be activated in a first step by way of UV light and which are bleached only in a subsequent second step.

DE 199 55 338 also discloses a process for producing color markings by laser treatment when using a mixture of cyan pigment, magenta pigment and yellow pigment, wherein those pigments are selectively bleached by red laser light, green laser light and blue laser light. That process is described for the use of a plastic body made from a material with the pigment mixture in question.

It is also known from WO 94/12352 to produce multi-colored markings by laser treatment using different wavelengths, on a plastic body which includes a pigment mixture and which can be in the form of a solid body and a coating. The coloration operation is effected by virtue of the pigments changing their color due to a color change in the laser treatment. EP 0 327 508 discloses a process in which a laser-sensitive dye A and a laser-insensitive dye B are contained in two separate, mutually superposed layers or alternatively in a common layer, and the dye A is bleached by laser treatment. Thus the laser treatment affords a color marking which however only involves a change in color of the dye A, and therefore only a maximum two-color image is obtained.

EP 0 190 997 B1 discloses a process in which a plastic layer in the form of a covering on a metal plate portion or a plastic plate contains an additive which is intended to change in color when subjected to a laser treatment, more specifically either by a color change from one color to another or by transformation into black.

DE 37 38 330 A1 discloses a laser labelling process for use in relation to a surface pigment coating, wherein pigments of the pigment coating change their internal molecular structure at different temperatures and furnish different colors. The specific surface temperatures are locally achieved with the laser radiation, whereby laser markings are obtained.

GB 2 240 948 A also discloses the laser labelling of identity cards. Here laser labelling is effected by the removal of different color layers. The laser marking which is obtained in that case appears in the form of a colored marking.

DE 41 31 964 A1 describes laser labelling on a multi-layer film with a metal layer and a hologram structure. The labelling procedure is implemented by region-wise destruction of the metal layer bearing the hologram.

EP 0 420 261 discloses a hot stamping film with a hologram structure which is individualised by way of laser treatment for the purposes of affording a safeguard against forgery. A change in material or color or removal of partial regions in the layer structure of the film is implemented by means of the laser beam.

EP 0 219 011 B1 describes a specific process for the laser labelling of identity cards. In that process black markings are produced in various transparent layers of the card by means of the laser. In that way parallax images are obtained in the mutually co-operating transparent layers.

SUMMARY OF THE INVENTION

The object of the invention is to provide a multi-layer body which, by virtue of laser treatment, guarantees a particularly high level of safeguard against forgery and in particular permits laser-induced markings to be produced. Another object of the invention is to provide a process for producing novel complex laser-induced markings.

The invention attains that object with the multi-layer body as set forth in claim 1 and the process for producing a laser-induced multi-layer image in such a multi-layer body as set forth in process claim 9.

The fact that the multi-layer body has a first laser-sensitive layer and a second laser-sensitive layer in which laser-induced image components of different configurations can be produced affords the possibility of producing a complexly composed, laser-induced multi-layer image. In the laser-sensitive layer with the laser-sensitive coloring agent, it becomes possible to produce a colorful laser-induced image component which, when using a suitable laser-sensitive coloring agent mixture comprising two or three bleachable coloring agent components, can be in the form of a multi-color image or full-color image. In the other laser-sensitive layer it is possible to use another laser-sensitive material, that is to say another coloring agent mixture or also a carbon or black doped material in which, in the laser treatment, it is possible to produce a different color marking, preferably a multi-colored color image or a black marking, preferably a gray scale image.

The various laser-sensitive layers can be arranged more or less preferably only in region-wise overlapping superposed relationship and can be more or less of a transparent nature, possibly only in region-wise fashion. With respective specific control of the laser treatment for each of the various laser-sensitive layers, it is possible to produce by a laser-induced process specific different image components which can co-operate to provide any complex multi-layer image.

Multi-layer images with particularly attractive optical effects are possible if, in addition to the plurality of laser-sensitive layers in the layer structure, there are also diffraction and/or hologram structures which for example at different viewing angles, give different optical effects in conjunction with the different laser-induced image components arranged in the various layers.

Preferred embodiments are described in greater detail hereinafter with reference to the accompanying Figures.

In order to be able to produce the desired laser-induced marking as selectively as possible in the individual laser-sensitive layers upon laser irradiation, the laser-sensitive layers can be such that they are sensitive only under given laser conditions, for example only at a given laser wavelength or irradiation angle. It is additionally also possible to arrange a special background layer as an intermediate layer between the laser-sensitive layers, which acts in the manner of a barrier layer for specific laser irradiation, for example in dependence on the laser wavelength, the irradiation angle and so forth. That background layer which acts as a barrier layer, in preferred embodiments, may also be provided only in a region-wise manner, that is to say it is only under a partial region of the laser-sensitive layer arranged thereabove, preferably only in a region under the laser-induced marking. By way of an only region-wise arrangement of such barrier and intermediate layers, it is also possible to achieve specific further effects, more specifically for example upon laser irradiation, a laser-induced marking can be produced in regions with an intermediate layer only in the upper laser-sensitive layer while, in regions without an intermediate layer, mutually superposed different laser-induced markings can then be obtained in the form of combined markings in both laser-sensitive layers. Particularly attractive optical effects are achieved if the laser-sensitive materials of the layers are different, so that for example a color marking is produced in the one layer and a black marking, preferably a gray scale image, is produced in the other layer.

DESCRIPTION OF THE PREFERRED EMBODIMENTS

Figure 1:
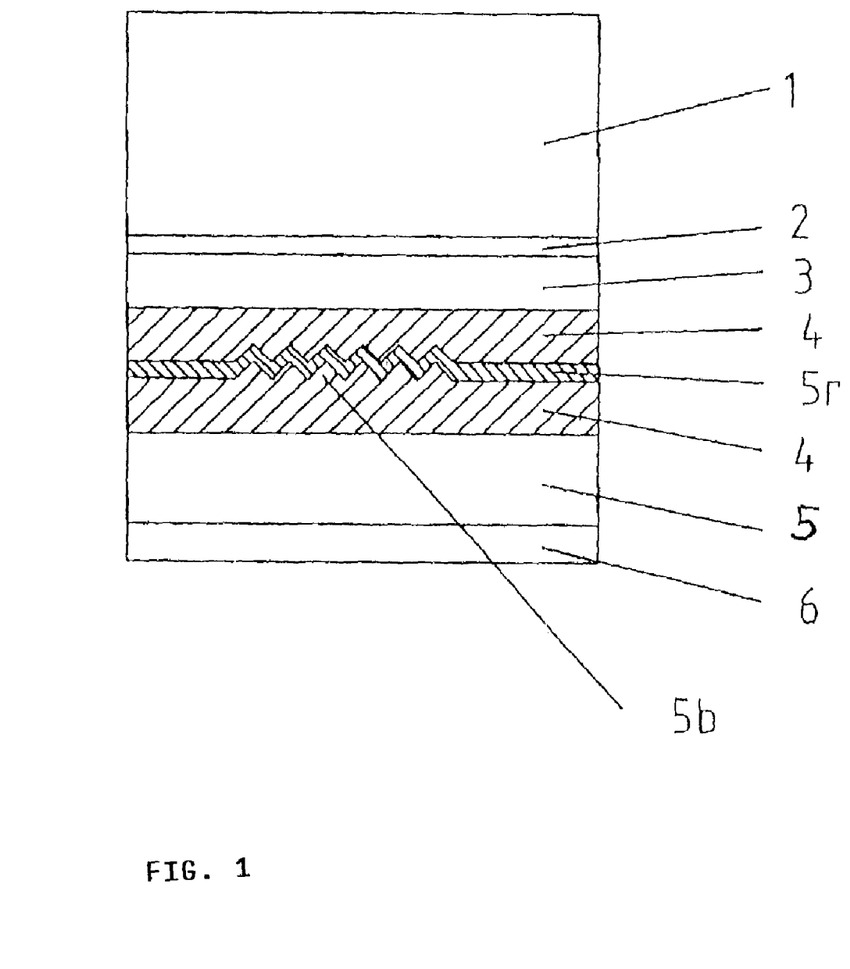
FIG. 1 shows a sectional view of an embodiment of a transfer film with two laser-sensitive layers.

The hot stamping film shown in FIG. 1 is a multi-layer body with two laser-sensitive layers 4 provided on both sides of a reflection layer 5r. By means of laser treatment of that multi-layer body, it is possible for different laser-induced markings to be introduced in the laser-sensitive layers, thereby producing a composite laser-induced multi-layer image. A corresponding consideration also applies in regard to the laminating film shown in FIG. 2, which in its layer structure corresponds to the transfer film in FIG. 1. A corresponding consideration also applies in regard to the hot stamping film shown in FIG. 3, which has a modified layer structure but also two laser-sensitive layers 4, 4a. The laminated body shown in FIG. 4 also has two laser-sensitive layers, namely the layer 4 which is arranged at the underside of the upper overlay film 30 in a hot stamping film applied there and the layer 32 which is in the form of a separate doped overlay film.

The structure of the individual multi-layer bodies is described in detail hereinafter with reference to the Figures, and also the laser treatment with which it is possible to produce a laser-induced image component in the form of a full-color image. The process for producing a gray scale image in the form of a laser-induced image component in relation to another laser-sensitive layer is also described.

In the film shown in FIG. 1 the layers occur in the following sequence:

Carrier layer 1, separation layer 2, protective layer 3, laser-sensitive layer 4, reflection layer 5r, laser-sensitive layer 4, additional lacquer layer 5 and adhesive layer 6. The laser-sensitive layers 4 provided on both sides of the reflection layer 5r can be of identical nature, that is to say the reflection layer is then arranged in that overall laser-sensitive layer. The laser-sensitive layers however may also be different. A diffraction structure 5b is provided in mutually adjoining regions of the laser-sensitive layer 4 and the reflection layer 5r. Alternatively the structure 5b can also be in the form of a hologram structure. In the illustrated embodiment, an increased level of safeguard against forgery is afforded in that two laser-sensitive layers adjoin the diffraction or hologram structure, and those can be the same or different. In this case the lacquer layer 5 which is optional is in the form of a transparent layer or in the form of a light backup layer. Alternatively the lacquer layer 5 and the adhesive layer 6 can be omitted and the second laser-sensitive layer 4 which is shown under the reflection layer 5r in FIG. 1 can be in the form of a laser-sensitive adhesive layer.

Figure 2:
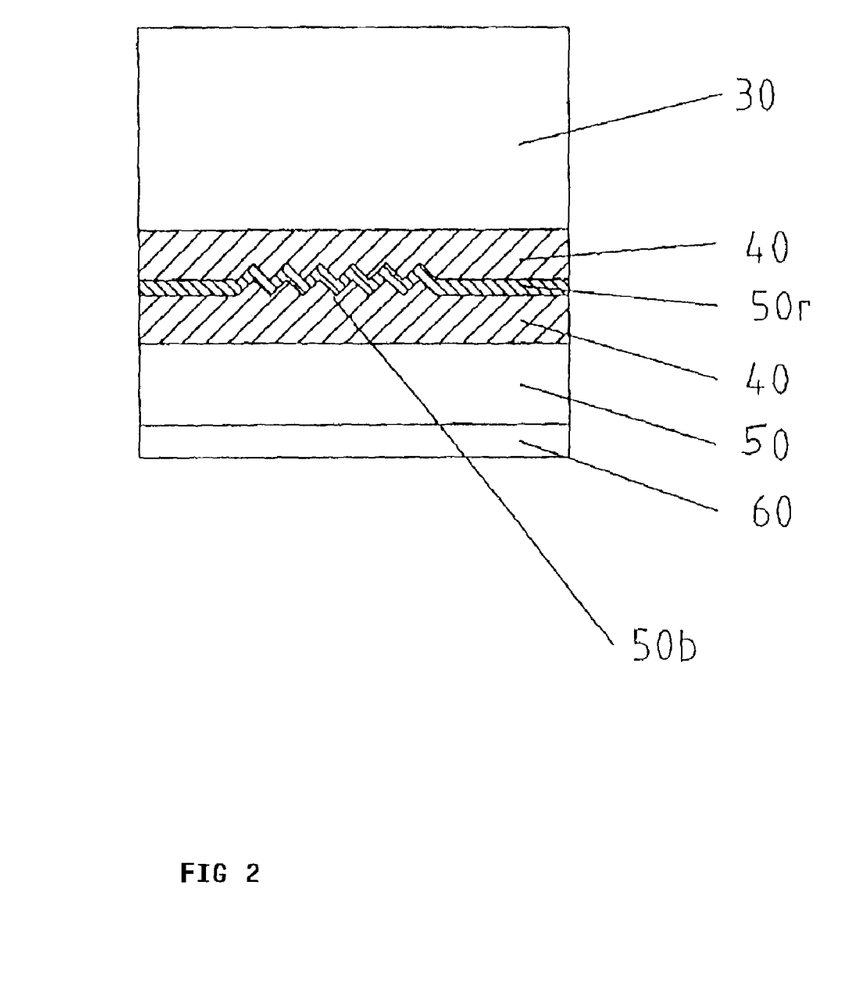
FIG. 2 shows a sectional view of an embodiment of a laminating film with a corresponding structure to the transfer film in FIG. 1.

FIG. 2 shows an embodiment of a laminating film having the sequence of layers corresponding to the structure of the hot stamping film. It includes a so-called overlay film 30, a laser-sensitive layer 40, a background layer-forming intermediate layer 50 which is optional and an adhesive layer 60 which is also optional. The laser-sensitive layer 40 is arranged in a corresponding manner to the laser-sensitive layer 4 on both sides of the reflection layer 50r, in which respect it is provided in a corresponding manner to FIG. 1 that the two laser-sensitive layers are the same or different. In a corresponding manner to the case with the hot stamping film in FIG. 1, a diffraction and/or hologram structure 50b is also provided in the case of the laminating film in FIG. 2, more specifically also in the region of the two laser-sensitive layers 40 and the reflection layer 50r which is therebetween.

In the laser treatment of the hot stamping film in FIG. 1 or the laminating film in FIG. 2, respective laser-induced image components are produced in the mutually superposed laser-sensitive layers, those image components being present in different layers. The laser treatment is preferably effected after the film in question is applied to the substrate, insofar therefore as the film applied to the substrate is irradiated from the exterior. Alternatively however it is also possible for the film to be subjected to laser treatment before being applied. In that case laser irradiation can then be effected from both sides of the film.

Different laser-induced image components in the mutually superposed laser-sensitive layers are obtained if the laser-sensitive layers have different laser-sensitive material and thus, with different, material-specific laser conditions, the laser-induced components can be produced in the different laser-sensitive layers. Alternatively however it is also possible to treat only the upper or the lower laser-sensitive layer, by a variation in the irradiation angle. That possibility is afforded by virtue of the fact that the reflection layer 5r is transmissive in respect of the laser radiation upon irradiation in perpendicular relationship, but is not or is less transmissive, upon irradiation at an acute angle. Differences also occur for transmission radiation through the diffraction structure so that accordingly suitable adjustment of the irradiation angle of the laser radiation makes it possible to treat the upper laser-sensitive layer separately in order to produce there a specific laser-induced image component, without the radiation passing into the lower laser-sensitive layer. In that way therefore it is also possible for the mutually superposed laser-sensitive layers to be treated separately, even if they are made from the same laser-sensitive material.

Figure 3:
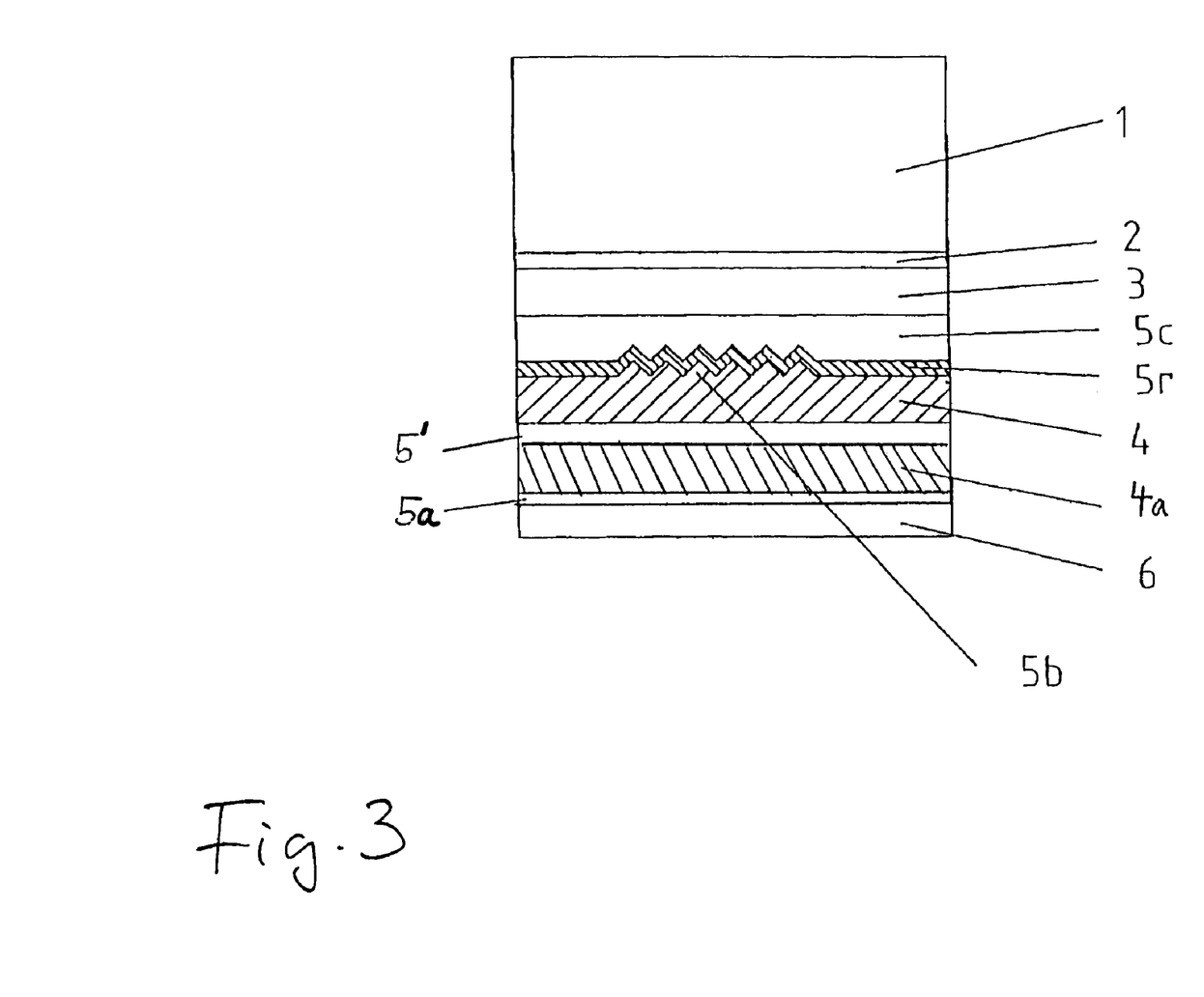
FIG. 3 shows a sectional view of a further embodiment of a transfer film with two laser-sensitive layers with a modified layer sequence.

The embodiment of the hot stamping film in FIG. 3 also has two laser-sensitive layers 4, 4a. They are however separated from each other by an interposed background layer 5'. The background layer 5' is a layer which is highly reflective for the laser radiation used in the laser treatment. In addition, the layer is non-transmissive and absorbent in respect of the non-reflected component of the laser radiation so that, in the laser treatment to produce the laser-induced marking in the upper laser-sensitive layer 4, no laser radiation passes into the subjacent laser-sensitive layer 4a. The background layer 5' is arranged under the laser-sensitive layer 4 exclusively in the region in which a laser-induced image component is to be produced in the laser-sensitive layer 4. In the region outside, the background layer 5' is not provided, that is to say arranged in that region is a material which is transmissive in respect, of the laser radiation or preferably the laser-sensitive material of the lower laser-sensitive layer 4a. In those regions in which therefore the background layer 5' is not provided, the laser-induced image component can be produced by laser radiation in the lower laser-sensitive layer 4a.

Preferably the two laser-sensitive layers 4, 4a are made from different laser-sensitive material, for which different, material-specific laser treatment conditions apply. In that way it is also possible that, during production of the laser-induced marking in the lower laser-sensitive layer 4a, a laser-induced change in the upper laser-sensitive layer 4 is not effected at the same time.

To protect the substrate from incident laser light, a further background layer 5a is arranged at the underside of the lower laser-sensitive layer 4a. That background layer 5a prevents laser radiation from reaching the substrate, in the laser treatment.

Figure 4:
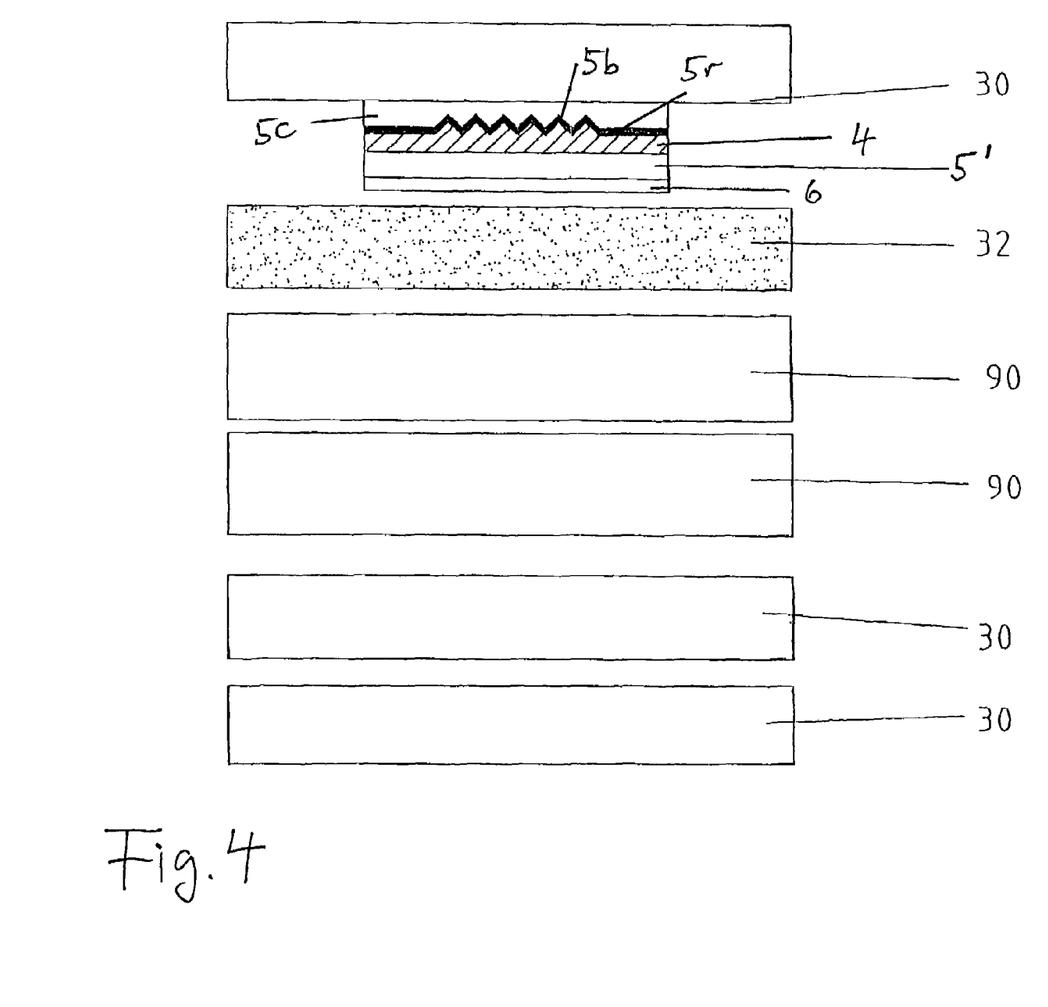
FIG. 4 shows an exploded view of a laminated body comprising a plurality of overlay films and inlets, wherein there are also two laser-sensitive layers.

The embodiment of FIG. 4 is a body which is laminated from various overlay films and inlets. At its underside the upper overlay film has a layer structure comprising a lacquer layer 5c, a reflection layer 5r, a laser-sensitive layer 4, a background layer 5' and an adhesive layer 6. A diffraction and/or hologram structure 5b is provided in the lacquer layer 5c, the reflection layer 5r and the laser-sensitive layer 4.

Those layers which are applied at the underside of the overlay film 30 are layers of a hot stamping film which is there applied on the underside of the overlay film. The overlay film 32 which is arranged under the overlay film 30 is in the form of a laser-sensitive film. It therefore forms a second laser-sensitive layer. In the illustrated embodiment the laser-sensitive material is in the form of carbon and/or black-doped material. This is a material which carbonises under the action of laser so that a laser-induced image component is produced by blackening in that layer formed by the overlay film 32. A gray scale image can be produced by a variation in the laser conditions, for example a variation in the laser power and/or the laser wavelength.

Arranged under the doped overlay film 32 is an inlet 90 and therebelow a further inlet 90. Those inlets can preferably be formed from paper material but also from plastic material, preferably in the form of inlet films. Disposed on the underside of the lower inlet 90 is an overlay film 30 and disposed thereon is a further overlay film 30.

The laser treatment for producing the different laser-induced image components in the laser-sensitive layers 4 and 32 is effected in embodiments in a corresponding manner to FIGS. 1 through 3.

The manner in which a full-color image component can be produced by laser-induced bleaching in a laser-sensitive layer comprising a coloring agent mixture consisting of three laser-sensitive coloring agent components, will also be described in detail hereinafter. The laser-sensitive material is a three-component mixture with a cyan pigment component, a magenta pigment component and a yellow pigment component.

In the bleaching operation, a blue or green or red color marking is produced, in a first step, by that location being irradiated with a given laser wavelength with which a given pigment component is bleached.

In order to produce the color blue, only the yellow pigment component may be bleached. Blue laser light is used for that purpose. A given minimum intensity is required for the bleaching procedure. In addition a certain pulse duration is not to be exceeded. In order to obtain a green color marking in the first step, only the magenta pigment component may be bleached. Green laser light is used for that purpose. In order to obtain a red color marking in the first stage, only the cyan pigment component may be bleached. Red laser light is used for that purpose.

In order at that location to produce a color marking of the color cyan or magenta or yellow, that location is subjected to laser treatment in a second step, more specifically using a laser wavelength with which a pigment component which is not yet bleached at that location is bleached. If a blue color marking has been produced in the first step, the cyan pigment component and the magenta pigment component are unbleached at that location. In order to produce the color cyan at that location, the magenta pigment component has to be bleached in this second step. That is effected with green laser light. That therefore produced a cyan-colored marking at that location.

If in the second step, instead of that cyan-colored marking, a magenta-colored marking is to be produced, then the blue color marking produced in the first step has to be treated with red laser light.

In that way the cyan pigment is bleached at that location so that therefore the magenta pigment remains unbleached at that location. Therefore there is the magenta-colored marking at that location.

In a corresponding manner a cyan-colored marking or a yellow-colored marking can be produced from a green color marking which was produced in the first step and which was formed from remaining unbleached cyan pigment and yellow pigment, more specifically by treatment with blue laser light and red laser light respectively.

In a corresponding manner, in the second step a red color marking produced in the first step can be converted into a yellow or magenta-colored marking, more specifically by laser treatment in the second step with green laser light or blue laser light respectively.

In order to obtain a transparent location at the location treated in the first and second steps, that is to say to obtain a white location if the background layer 5' is white, that location has to be treated in a third step with a laser beam whose wavelength is so adjusted that the pigment component which has remained unbleached at that location after the second step is bleached, that is to say the yellow color marking has to be bleached with blue laser light, the magenta-colored marking with green light and the cyan-colored marking with red laser light.

Further adjacent locations are then treated in the laser-sensitive layer 4 in the same manner in order to produce further color markings in the layer 4 of the stamping film. In that way it is possible to produce a full-color image.

Laser treatment can also be used to produce color markings or a full-color image in the coloring agent or agents in the laser-sensitive layer by a color change. The laser treatment can be effected in a corresponding manner with successive process steps. Pigments are involved as coloring agents, that is to say substances for imparting color. The pigments are generally insoluble and are usually inorganic substances. However mostly soluble, organic coloring agents can also be used as the coloring agents. The color change is effected in each case with specific laser conditions which are then applied in the individual steps in the laser treatment.

The described bleaching and color conversion process can also be used in a corresponding manner when the laser-sensitive material comprises only one or two coloring agent components. It is also possible to use other coloring agent components and also other laser conditions, in particular other laser wavelength ranges, in the laser treatment.

The laser treatment is generally effected on the film when applied to the substrate. Alternatively however it can also be effected prior to applying the film, by a procedure whereby solely the film is irradiated, more especially in particular when the protective layer 3 or any other layer, for example a background layer 5', is in the form of a layer which is not or is only partially transparent in relation to the laser radiation or is in the form of a layer which is not transparent for laser radiation in the given wavelength range, or if there is provided an additional UV-absorbent, protective layer. The laser treatment is then effected, preferably prior to application of the film, by the laser beam being directed on to the rear side of the film, that is to say on to the lower background layer 5a or the adhesive layer 6, and thus the laser-sensitive layer 4 is accordingly treated from the other side in order to produce the color markings therein, in the same manner. The background layer 5' and the adhesive layer 6 in these uses are transparent or at least partly transparent in relation to the laser radiation in question.

The composition of the layers used in the specific embodiments is as follows:

| Release layer 2 (separation layer): | |
|---|---|
| toluene | 99.5 parts |
| ester wax (dropping point 90° C.) | 0.5 parts |
| Protective layer 3 (protective lacquer layer): | |
| methylethylketone | 61.0 parts |
| diacetone alcohol | 9.0 parts |
| methylmethacrylate (Tg = 122° C.) | 18.0 parts |
| polyethylene dispersion (23% in xylene) (softening point 140° C.) | 7.5 parts |
| high-molecular dispersing additive (40%, amino number 20) | 0.5 parts |
| extender (aluminum silicate) | 4.0 parts |
| Laser-sensitive layer 4 (first color lacquer layer): | |
| methylethylketone | 34.0 parts |
| toluene | 26.0 parts |
| ethylacetate | 13.0 parts |

-continued

| | |
|---|---|
| cellulose nitrate (low viscosity, 65% in alcohol) | 20.0 parts |
| linear polyurethane (Fp > 200° C.) | 3.5 parts |
| high-molecular dispersing additive (40%, amino number 20) | 2.0 parts |
| e.g. Pigment Blue 15:4 | 0.5 parts |
| Pigment Red 57:1 | 0.5 parts |
| Pigment Yellow 155 | 0.5 parts |
| Background layer 5' (second color layer lacquer): | |
| methylethylketone | 40.0 parts |
| toluene | 22.0 parts |
| ethylene vinylacetate terpolymer (Fp = 60° C.) | 2.5 parts |
| polyvinylchloride (Tg: 89° C.) | 5.5 parts |
| polyvinylchloride (Tg: 40° C.) | 3.0 parts |
| dispersing additive (50%, acid number 51) | 1.0 parts |
| titanium dioxide (d = 3.8-4.2 g/cm$^3$) | 26.0 parts |
| Adhesive layer 6: | |
| methylethylketone | 55.0 parts |
| toluene | 12.5 parts |
| ethanol | 3.5 parts |
| polyvinylacetate (softening point 80° C.) | 6.0 parts |
| butyl/methylmethacrylate (Tg: 80° C.) | 8.0 parts |
| ethylmethacrylate resin (Tg: 63° C.) | 3.0 parts |
| methacrylate copolymer (Tg: 80° C.) | 5.0 parts |
| unsaturated polyester resin (softening point 103° C.) | 3.5 parts |
| silicon dioxide | 3.5 parts |

Figure 5:
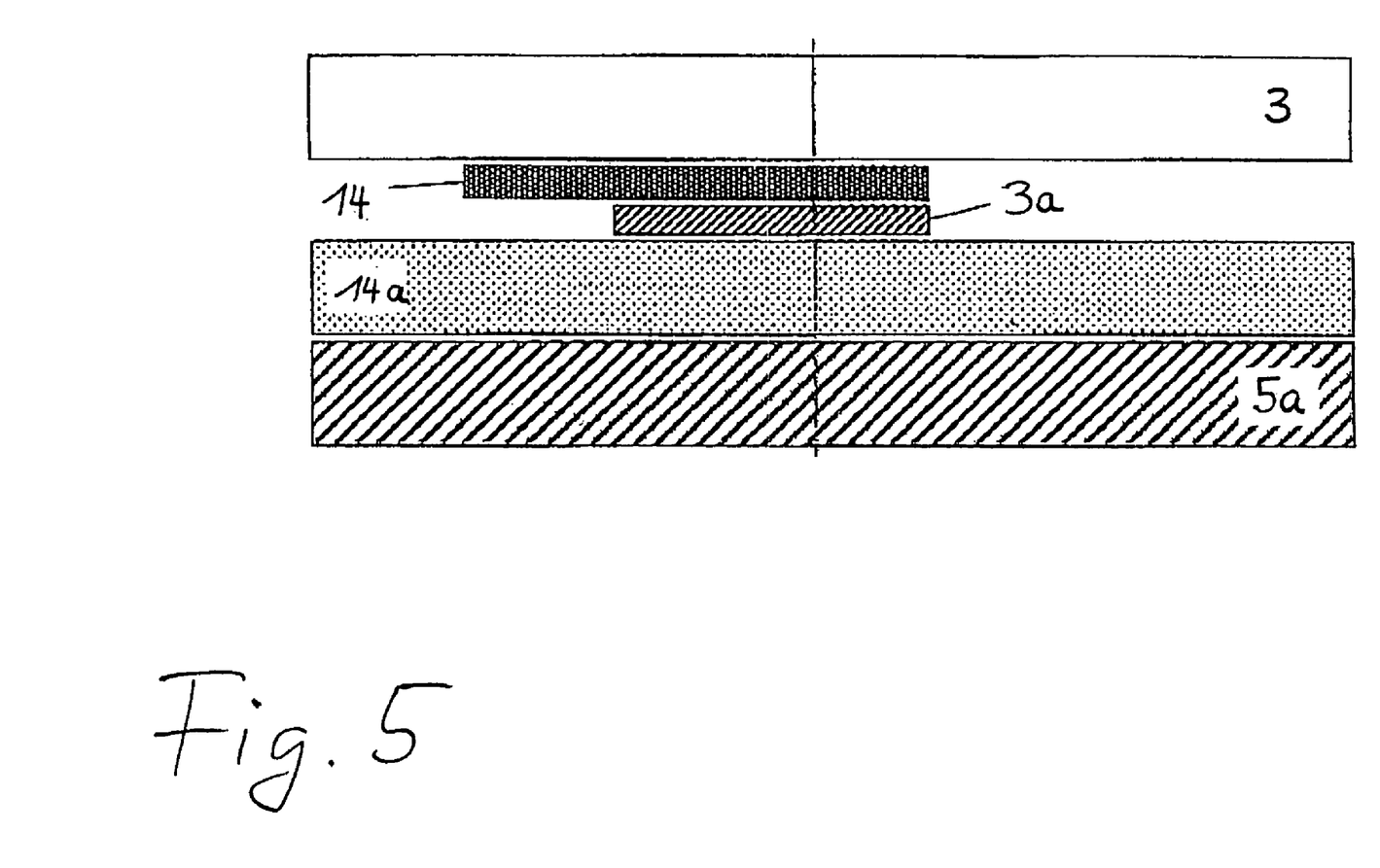
FIG. 5 shows a sectional view of a further embodiment.
Figure 6:
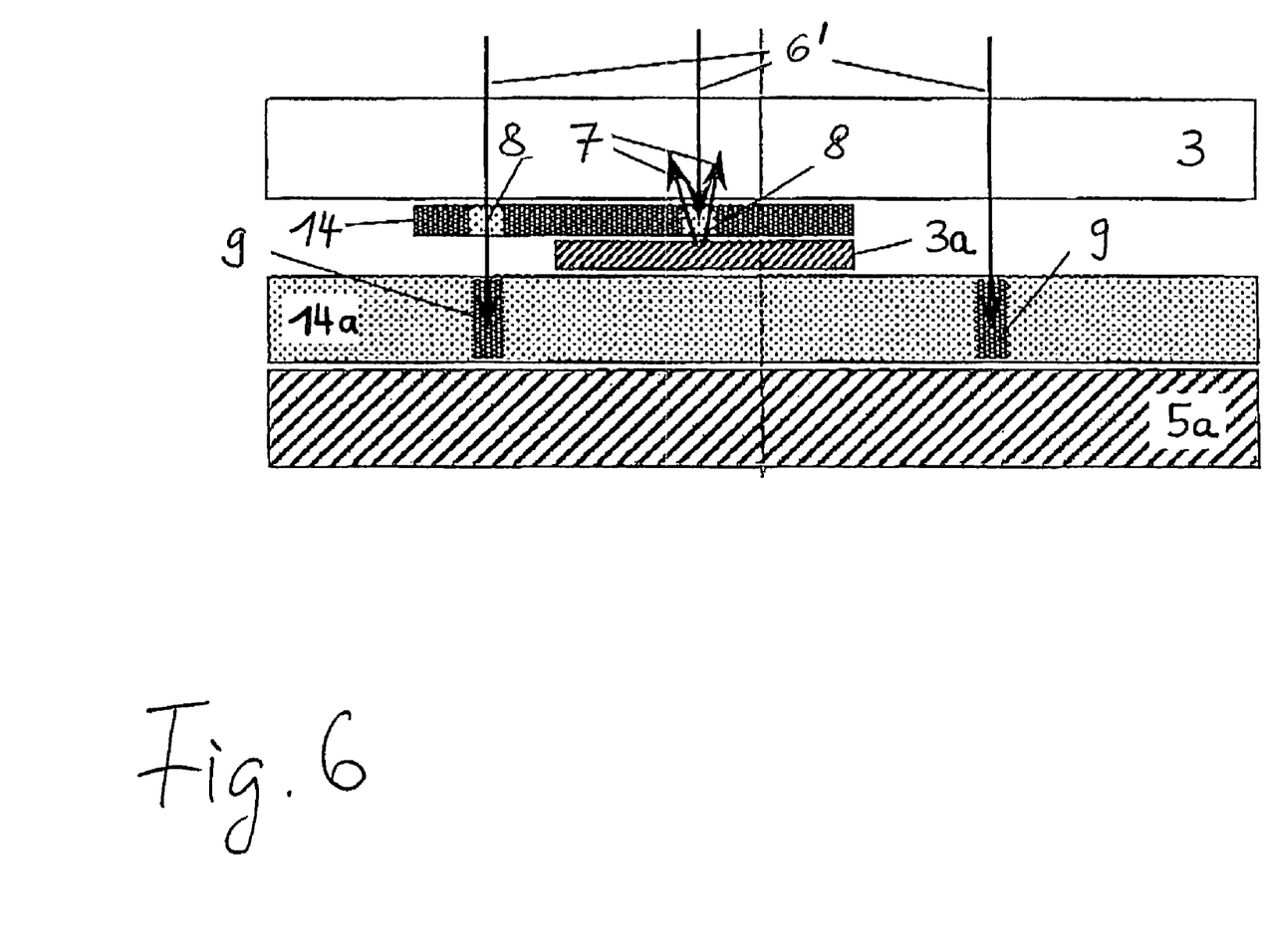
FIG. 6 shows a sectional view of the embodiment of FIG. 5 to illustrate the laser treatment.
Figure 7:
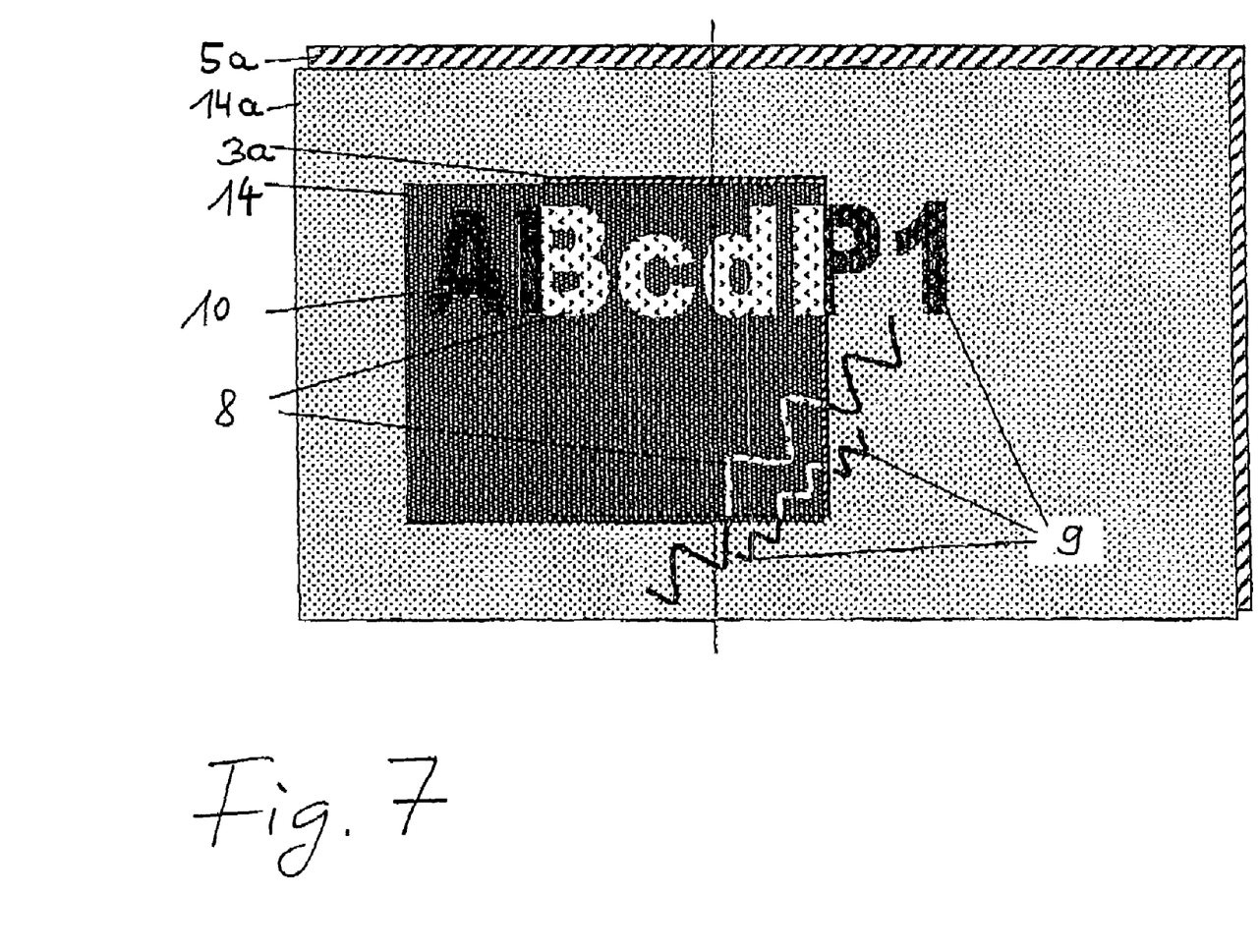
FIG. 7 shows a plan view of a laser-induced image of the embodiment in FIGS. 5 and 6.

The subject-matter of the invention will finally be described once again briefly with its essential features and functions, with reference to FIGS. 5 through 7.

There is provided a multi-layer data carrier which includes at least two different laser-sensitive layers, wherein one laser-sensitive layer 14 is preferably laser-personalisable in multi-color fashion and a further laser-sensitive layer 14a is preferably laser-personalisable in monochrome fashion.

For that purpose the laser-sensitive materials can be adjusted in such a way that a marking can be produced in both materials by means of laser radiation of a defined wavelength and intensity.

The laser-sensitive layers are preferably disposed in mutually superposed relationship over part of their area.

A layer 3a which is opaque in relation to the laser radiation is arranged over part of the area between those laser-sensitive layers. That optical barrier layer 3a is a reflecting layer, in a preferred configuration a diffusely reflecting layer. It preferably includes an adequate proportion of white pigment and thus prevents the laser light from penetrating into the subjacent layers. That is the prerequisite for the arrangement according to the invention of the different, laser-personalisable layers. The layer 14 which can be laser-personalised in multi-color fashion can be disposed over the layer 14a which can be laser-personalised in monochrome fashion, separated by the optical barrier layer 3a, without unintended carbonisation occurring in the color laser personalisation procedure, in the subjacent layer 14a which can be laser-personalised in monochrome fashion.

The optical barrier layer 3a can be incorporated as an additional layer in various ways. Preferably the optical barrier layer 3a is applied to one of the cover layers in a decorative printing procedure.

The described multi-layer data carrier can be produced in accordance with one of the following processes:

An injection molding process, preferably multi-component injection molding, or in-mold decoration, lamination of film composites, lamination of mixed structures, preferably of paper and plastic films, coating paper carriers or plastic carriers,
printing on paper carriers or plastic carriers,
film transfer process on paper carriers or plastic carriers,
or a combination of said processes.

FIG. 5 shows a preferred structure of a data carrier.

The optical barrier layer 3a can also be arranged above the laser-sensitive layers and thus provide for covering the laser-sensitive layers, over part of the area involved. Preferably then that optical barrier layer 3a is in the form of a decorative print, preferably in the form of line patterns such as for example guilloche patterns. The image information of the decorative print is then transferred into the laser-personalisable layers after the laser personalisation operation; insofar as here the laser-personalised image information is interrupted by the image information of the optical barrier layer 3a.

As the graphic element generated by means of the color laser personalisation operation appears, in the sense of a color image, as part of a document, security in relation to forgery must be afforded. The risk of a forgery arises if the color image can be separated from the document and can be replaced by another one. A high level of protection against forgery is enjoyed if graphic elements of the laser personalisation effect combine the color image with other elements of the document, in the sense of a photograph-integrated background.

Integration of the different features: color laser personalisation and laser personalisation in gray scales in a data carrier is effected in such a form that the different, laser-personalisable layers are arranged in mutually superposed relationship only over a part of the area involved. That affords different possible options in respect of integrated color laser personalisation.

FIG. 6 shows the possible options in terms of laser marking on a preferred structure of a data carrier.

If laser personalisation is effected at the location 6' at which there is only the monochrome laser-personalisable layer 14a, a monochrome black marking 9 is produced.

If laser personalisation is effected at the location 6' at which only the multi-colored laser-personalisable layer 14 is disposed over the barrier layer 3a which is opaque in relation to the laser radiation and over the monochrome laser-personalisable layer 14a, a multi-colored marking 8 is produced.

If laser personalisation is effected at the location 6' at which only the multi-colored laser-personalisable layer 14 is disposed over the monochrome laser-personalisable layer 14a, without being separated by the optical barrier layer 3a, superimposition of a multi-colored marking 8 and a monochrome black marking 9 is produced. That marking 10 (see FIG. 7) is also multi-colored, by virtue of the opposite effects of bleaching and blackening however it appears darker than the pure, multi-colored marking 8.

FIG. 7 shows how it is possible to achieve integrating image elements by the combination of laser personalisation in color with conventional gray scale lasering. For that purpose the absorption of the laser-personalisable layers 14, 14a is so adjusted that the laser power required for the bleaching procedure is sufficient to carbonise in the monochrome laser-personalisable layer 14a which is additionally used in the document. If the monochrome laser-personalisable layer 14a is under the multi-colored laser-personalisable layer 14 and same is only covered over part of its area by the optical barrier layer 3a, that structure allows image elements such as for example lines or alphanumeric characters which are lasered beyond the boundary of the optical barrier layer 3a to cause carbonisation of the background. It is possible in that way to produce continuous image elements with a change in the nature of the marking within the element. If the boundary of the optical barrier layer 3a coincides with the boundary of the multi-colored laser-personalisable layer 14, there is a change from colorful to non-colorful. Those continuous items of image information have an integrating action.

Integrating image elements are also possible, which are achieved by the combination of laser personalisation in color with further graphic elements. Transparency of the multi-colored laser-personalisable layer 14 increases with increasing bleaching. That permits layout elements such as for example guilloche patterns which are printed on layers beneath the multi-colored laser-personalisable layer 14, for example on the core material, to appear after the color lasering operation in the color image. Accordingly image elements such as for example printed lines which are covered only over part of the area involved by the multi-colored laser-personalisable layer 14 appear after the color laser personalising operation as integrating elements. Integrating elements like these, which extend over the edge of a personalised feature, increase the difficulty in forging the data carrier, to a high degree.

A further feature of the invention provides that the additional layer permits specific and targeted adjustment of the brightness of the background independently of the carrier material used. Thus for example an additional effect can be achieved by the use of optical brightening agents or the use of pigment additives.

It follows from all this that the subject-matter of the invention is a multi-layer data carrier which includes at least two different laser-sensitive layers, wherein one laser-sensitive layer is multi-colored laser-personalisable and a further laser-sensitive layer is monochrome laser-personalisable. Those laser-sensitive layers are in mutually superposed relationship over part of the area involved and preferably the multi-colored laser-personalisable layer is over the monochrome laser-personalisable layer. The laser-sensitive layers can be such that, in a laser marking step using the same wavelength and laser radiation energy, a respective marking can be attained in both the multi-colored laser-personalisable and also in the monochrome laser-personalisable layer.

Preferably, arranged between those laser-sensitive layers over at least a part of the area involved is a barrier layer which is opaque in relation to the laser radiation.

Preferably, the laser radiation-opaque barrier layer is a reflecting layer which in a preferred embodiment can be a diffusely reflecting layer and includes an adequate proportion of an additive which reflects or scatters the laser light.

Laser personalisation can be effected in an upper laser-personalisable layer, preferably in a multi-colored laser-personalisable layer, without a laser-personalisable layer which is beneath that layer being altered by the laser radiation, insofar as laser personalisation is effected where the laser-sensitive layers are optically separated from each other by a barrier layer which is opaque in respect of the laser radiation.

Laser personalisation can be effected with a laser beam both in an upper laser-personalisable layer, preferably in a multi-colored laser-personalisable layer, and also in a laser-personalisable layer which is beneath that layer, insofar as laser personalisation is effected where the laser-sensitive layers are not optically separated from each other by a barrier layer which is opaque in respect of the laser radiation.

Laser personalisation can be implemented with a laser beam both in an upper laser-personalisable layer, preferably in a multi-colored laser-personalisable layer, and also in a laser-personalisable layer which is below said layer, insofar as laser personalisation is effected in such a way that graphic image elements are arranged beyond the surface portions of the respective laser-personalisable layer, preferably the multi-colored laser-personalisable layer, so that within the image element, there is a change from multi-colored to monochrome representation.

Laser personalisation can be implemented with a laser beam in a laser-personalisable layer, insofar as laser personalisation is effected in such a way that graphic image elements are arranged beyond the surface portions of the optical barrier layer arranged above the laser-personalisable layer, so that, within the laser-personalisable layer, an interruption in the graphic image elements produced in that way is achieved. As interrupting elements in the sense of an optical barrier layer, preferably printed elements such as for example guilloche patterns can be arranged above the laser-personalisable layer.

Laser personalisation can be implemented with a laser beam in a multi-colored laser-personalisable layer, so that creative elements, preferably printed elements such as for example guilloche patterns which are printed on layers beneath the multi-colored laser-personalisable layer, for example on the carrier material, appear after the color lasering operation in the color image, insofar as the transparency of the multi-colored laser-personalisable layer is increased by the process of laser marking.

An essential advantage of the invention is that the known laser persohalisation in gray scales is combined with the new method of color laser personalisation. The security of documents can be substantially increased by the combination in the described manner.

The invention claimed is:

1. A multi-layer body in the form of a multi-layer film or in the form of a layer composite laminated from at least one overlay film and an inlet, comprising:
    a first laser-sensitive layer having a first laser-sensitive material, wherein the first laser-sensitive material has a laser-sensitive coloring agent which is bleachable by the action of laser radiation or which responds to the action of laser radiation with a color change;
    a second laser-sensitive layer having a second laser-sensitive material, wherein the second laser-sensitive material has a laser-sensitive coloring agent which is bleachable by the action of laser radiation or which responds to the action of laser radiation with a color change or the second laser-sensitive material has a doped material which is blackened by the action of laser radiation, and wherein the first and second laser-sensitive layers are arranged in a mutually overlapping relationship at least in region-wise manner; and
    an intermediate background layer arranged at least in a region-wise manner and disposed between the first and second laser-sensitive layers, which acts as a barrier layer which is not transparent for the laser radiation used for producing a laser-induced marking in the first and/or second laser-sensitive layer,
    wherein a complexly composed, laser-induced, multi-layer image is producible in the multi-layer body.

2. A multi-layer body as set forth in claim 1, further comprising a second background layer, wherein the second background layer is arranged at least in a partial region on a side of the first or second laser-sensitive layer, which is opposite the intermediate background layer, wherein the second background layer is reflecting and/or non-transparent or substantially non-transparent and/or absorbent for the laser radiation used for producing the laser-induced marking in the first and/or second laser-sensitive layer.

3. A multi-layer body as set forth in claim 1, wherein the intermediate background layer is reflecting and/or absorbent for the laser radiation used for producing the laser-induced marking in the first and/or second laser-sensitive layer.

4. A multi-layer body as set forth in claim 1, further comprising a second background layer, wherein the second background layer is arranged at least in a partial region on a side of the first or second laser-sensitive layer, which is opposite the intermediate background layer, wherein the intermediate background layer and/or the second background layer is transparent for light in the visible spectral range and/or is non-transparent for laser radiation of only given laser wavelength ranges and/or irradiation angles.

5. A multi-layer body as set forth in claim 1, wherein the first laser-sensitive material differs from the second laser-sensitive material.

6. A multi-layer body as set forth in claim 1, wherein the laser-sensitive coloring agent is in the form of a mixture of at least two laser-sensitive coloring agent components, and wherein under the laser conditions which are specific for an alteration of one laser-sensitive a coloring agent component of the mixture, the other laser-sensitive coloring agent components of the mixture are not or are substantially not alterable.

7. A multi-layer body as set forth in claim 6, wherein the two laser-sensitive coloring agent components are selected from the group consisting of a cyan coloring agent, a magenta coloring agent and a yellow coloring agent.

8. A multi-layer body as set forth in claim 1, wherein the doped material is in the form of carbon and/or black doped material.

9. A process for producing a multi-layer image in a multi-layer body as set forth in claim 1, wherein the multi-layer image is composed of a plurality of laser-induced image components, insofar as a first laser-induced image component is produced by the action of laser radiation under first laser conditions in a first laser-sensitive layer of the multi-layer body, wherein the first layer is multi-colored laser-marked, and a second laser-induced image component is produced by the action of laser radiation under second laser conditions in a second laser-sensitive layer of the multi-layer body, wherein the second layer is monochrome black laser-marked and the first and second laser-sensitive layers are arranged in mutually superposed relationship over part of the area and arranged between the laser-sensitive layers is a layer which is opaque in relation to the laser radiation.

10. A process as set forth in claim 9, wherein a monochrome black marking is produced at a location at which there is only the second laser-sensitive layer and/or a multi-colored marking is produced at a location at which the first laser-sensitive layer is over the layer which is opaque in relation to the laser radiation and over the second laser-sensitive layer.

11. A process as set forth in claim 9, wherein the first laser conditions and the second laser conditions are different, preferably in respect of laser wavelength and/or radiation intensity and/or irradiation angle.

12. A process as set forth in claim 9, wherein the first laser-induced image component and the second laser-induced image component are produced simultaneously or in displaced relationship with each other in respect of time.

13. A process as set forth in claim 9, wherein the laser-induced image component is introduced in a region of the laser-sensitive layer, which region is arranged over a background layer which for the laser radiation used is reflecting and/or for the non-reflected portion of the laser radiation is non-transparent and/or absorbent.

14. A process as set forth in claim 9, wherein the laser-induced image component is produced by laser-induced bleaching or laser-induced color change in the form of a multi-color image, preferably a full-color image.

15. A process as set forth in claim 9, wherein the laser-induced image component is produced by laser-induced blackening preferably in the form of a gray scale image.

16. A process as set forth in claim 9, wherein the laser-sensitive material is in the form of a mixture of at least two and preferably three laser-sensitive coloring agent components, wherein each of the two or three coloring agent components can be changed, preferably bleached, by means of laser under respective laser conditions specific for the component, wherein for each of the three coloring agent components it is provided that under the laser conditions specific for one coloring agent component the other one or both other coloring agent components is or are not or substantially not bleachable.

17. A process as set forth in claim 16, wherein a coloring agent mixture comprising two or three of the following coloring agent components is used: cyan coloring agent, magenta coloring agent and yellow coloring agent, wherein it is preferably provided that red laser light is used for bleaching the cyan coloring agent, green laser light is used for bleaching the magenta coloring agent and blue laser light is used for bleaching the yellow coloring agent.

18. A multi-layer body as set forth in claim 1, wherein a colored image component of the laser-induced multi-layer image is producible in the first layer-sensitive layer and a black marking as a further component of the laser-induced multi-layer image is producible in the second laser-sensitive layer.

19. A multi-layer body as set forth in claim 18, wherein the black marking is in the form of a gray scale image.

20. A multi-layer body as set forth in claim 1, further comprising diffraction and/or hologram structures, which give different optical effects at different viewing angles.

21. A multi-layer body as set forth in claim 1, wherein the laser processing conditions for the first laser-sensitive material and for the second laser-sensitive material differ.

22. A multi-layer body as set forth in claim 1, wherein the multi-layer film is a transfer film or a laminating film.

* * * * *

UNITED STATES PATENT AND TRADEMARK OFFICE
CERTIFICATE OF CORRECTION

PATENT NO. : 7,300,694 B2  
APPLICATION NO. : 10/494098  
DATED : November 27, 2007  
INVENTOR(S) : Lutz et al.

Page 1 of 1

It is certified that error appears in the above-identified patent and that said Letters Patent is hereby corrected as shown below:

IN THE SPECIFICATION:

Column 11, line 30, now reads "laser persohalisation in gray scales" should read --laser personalization in gray scales--

Column 12, line 23, now reads "of one laser-sensitive a coloring" should read --of one laser-sensitive coloring--

Signed and Sealed this

Seventeenth Day of June, 2008

JON W. DUDAS  
*Director of the United States Patent and Trademark Office*